US012737828B1

(12) United States Patent
Koka et al.

(10) Patent No.: US 12,737,828 B1
(45) Date of Patent: Sep. 15, 2026

(54) ANALYZING ENTERPRISE ACTIVITY TO IDENTIFY PATENTABLE SUBJECT MATTER AND CREATE A CORRESPONDING PATENT DISCLOSURE

(71) Applicants: Tejomayi Koka, Leander, TX (US); Eesha Avula, Cedar Park, TX (US); Nhu T.H Nguyen, Austin, TX (US)

(72) Inventors: Tejomayi Koka, Leander, TX (US); Eesha Avula, Cedar Park, TX (US); Nhu T.H Nguyen, Austin, TX (US)

( * ) Notice: Subject to any disclaimer, the term of this patent is extended or adjusted under 35 U.S.C. 154(b) by 0 days.

(21) Appl. No.: 19/449,671

(22) Filed: Jan. 15, 2026

(51) Int. Cl.
*G06Q 50/18* (2012.01)
*G06F 16/93* (2019.01)

(52) U.S. Cl.
CPC ........... *G06Q 50/184* (2013.01); *G06F 16/93* (2019.01); *G06F 2216/11* (2013.01)

(58) Field of Classification Search
CPC .... G06Q 50/184; G06F 16/93; G06F 2216/11
See application file for complete search history.

(56) References Cited

U.S. PATENT DOCUMENTS

2002/0059076 A1* 5/2002 Grainger .............. G06Q 10/109 705/50
2018/0158159 A1* 6/2018 Divine ................. G06Q 50/184
2019/0354349 A1* 11/2019 Gutierrez ................ G06F 30/20
2023/0062307 A1* 3/2023 Ramsl ................... G06F 16/166
2025/0292184 A1* 9/2025 Walters ................... G06F 16/93
2025/0315905 A1* 10/2025 Subramaniam ..... G06F 11/3608
2025/0384206 A1* 12/2025 Baird .................... G06F 40/186

FOREIGN PATENT DOCUMENTS

WO WO-2024173577 A1 * 8/2024 ......... G06F 16/9024

OTHER PUBLICATIONS

Yao, Shunyu, et al. "React: Synergizing reasoning and acting in language models." The eleventh international conference on learning representations. 2022. (Year: 2022).*

* cited by examiner

*Primary Examiner* — Carrie S Gilkey
(74) *Attorney, Agent, or Firm* — Shiv S. Naimpally; Sikander M. Khan; Flagship Patents

(57) ABSTRACT

As an example, a server gathers data from a private network associated with an enterprise, converts the data into a set of vector embeddings, and determines, by an artificial intelligence and based on one or more policies, a probability that individual vector embeddings in the set of vector embeddings include a patentable idea. The server performs a search of external databases for the patentable idea to create search results and determines a score for individual patentable ideas in the set of patentable ideas based on the search results. A large language model generates a patent disclosure document for the patentable idea, provides the patent disclosure document to a patent review committee, receives comments from individual members of the patent review committee, and provides the comments as reinforcement learning feedback to the artificial intelligence to improve a detection of patentable ideas.

20 Claims, 4 Drawing Sheets

ANALYZING ENTERPRISE ACTIVITY TO IDENTIFY PATENTABLE SUBJECT MATTER AND CREATE A CORRESPONDING PATENT DISCLOSURE

BACKGROUND

In an enterprise, many patentable ideas remain undiscovered because employees do not realize that their innovations may be patentable. Typically, it is up to the employees to create and submit a disclosure for internal review and a review board in the Enterprise determines whether the idea warrants filing a patent application. For example, an employee may fill out and submit a disclosure template and the review board may ask the employee questions and then decide whether the idea is potentially patentable. The work involved in preparing and submitting a disclosure and answer questions from the review board is on top of any deliverables the employee has, which often deters employees from submitting a disclosure for review. In addition, an employee that implements an improvement to an internal process may be unaware that the improvement may be potentially patentable. Because of this, an enterprise may miss an opportunity to file for patent protection.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a server gathers data from a private network associated with an enterprise, converts the data into a set of vector embeddings, and determines, by an artificial intelligence and based on one or more policies, a probability that individual vector embeddings in the set of vector embeddings include a patentable idea. The server performs a search of external databases for the patentable idea to create search results and determines a score for individual patentable ideas in the set of patentable ideas based on the search results. A large language model generates a patent disclosure document for the patentable idea, provides the patent disclosure document to a patent review committee, receives comments from individual members of the patent review committee, and provides the comments as reinforcement learning feedback to the artificial intelligence to improve a detection of patentable ideas.

The systems and techniques described herein extend beyond AI-assisted drafting by including a reinforcement-calibrated framework for identifying potential inventions from operational system behavior in an enterprise. The systems and techniques analyze machine-generated artifacts, including runtime logs, telemetry, execution traces, and other system-level signals, to identify technical activity indicative of potentially inventive concepts, evaluate the potential using quantitative evaluation metrics, and adjust detection and scoring parameters based on patent review committee comments and/or prosecution history (when a corresponding patent application is filed). The generation of a draft patent disclosure and/or patent application may be performed as a downstream function of this iterative discovery and calibration process.

BRIEF DESCRIPTION OF THE DRAWINGS

A more complete understanding of the present disclosure may be obtained by reference to the following Detailed Description when taken in conjunction with the accompanying Drawings.

In the figures, the left-most digit(s) of a reference number identifies the figure in which the reference number first appears. The same reference numbers in different figures indicate similar or identical items.

DETAILED DESCRIPTION

Figure 1:
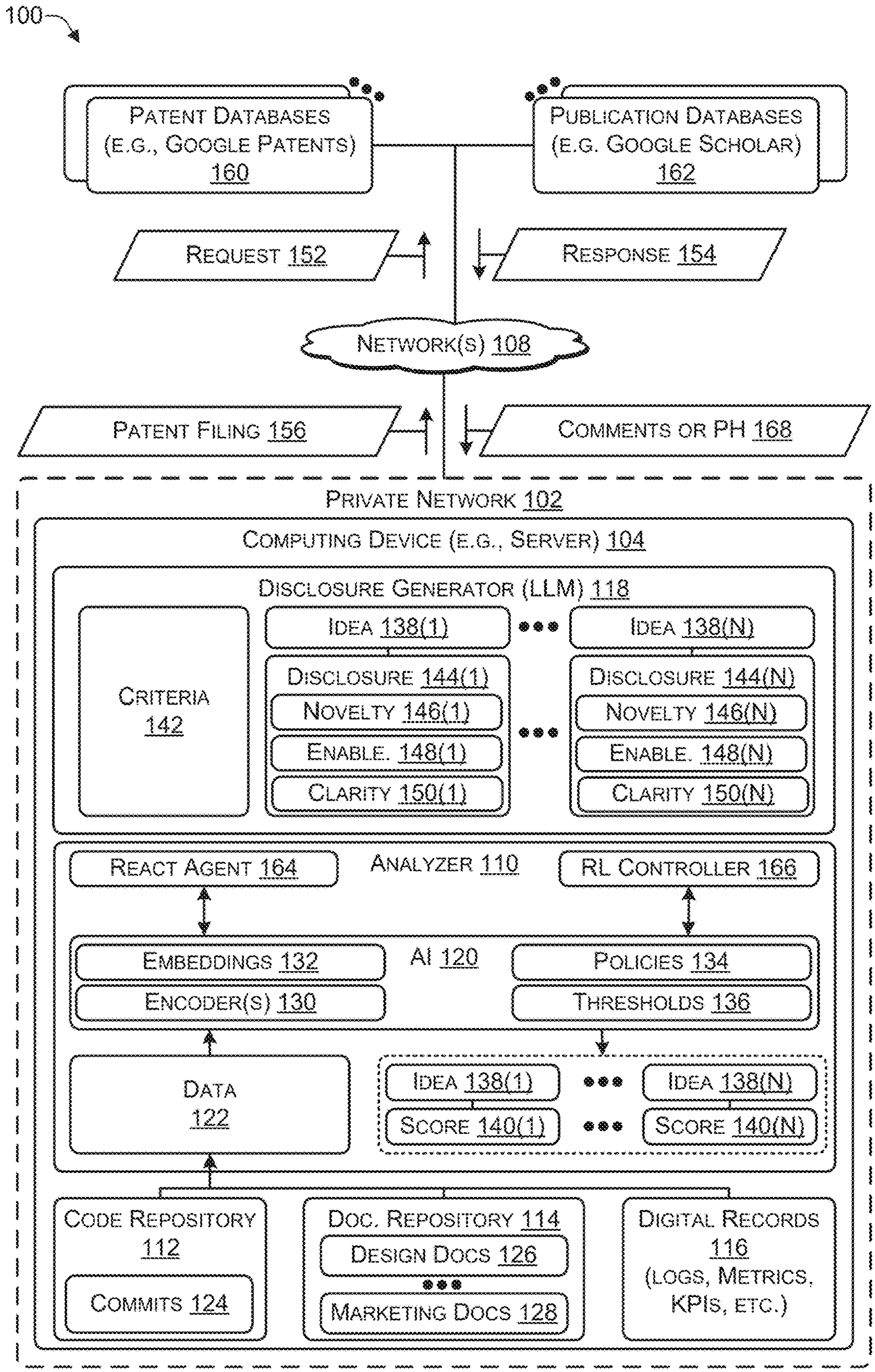
FIG. 1 is a block diagram of a system that includes an analyzer and a disclosure generator, according to some embodiments.

The systems and techniques described herein use an AI-driven reinforcement learning (RL) framework that autonomously discovers, scores, and drafts potential invention disclosures for ideas distilled from multi-modal enterprise data. In some cases, the systems and techniques may automatically (without human interaction) draft and file a provisional patent application for one or more ideas. Individual ideas receive a score indicating a likelihood of obtaining a patent and a section-by-section quality evaluation that is used to guide AI-based automated drafting and iterative improvement based on feedback from resulting patent outcomes. For example, the systems and techniques may iteratively determine that patent applications related to a first subject matter, such as financial transactions, are difficult and/or expensive to get allowed (as a patent) and may learn to score ideas with the first subject matter relatively low. The systems and techniques may iteratively determine that patent applications related to a second subject matter, such as cybersecurity, are relatively straightforward to get allowed (as a patent) and may learn to score ideas with the second subject matter relatively high.

For each input $x_i$ (such as, for example, code, documents, diagrams, logs, or other types of digital records), an AI model computes an invention probability $p_i=f_\theta(x_i)$. A composite quality score $Q_i=\alpha n_i+\beta e_i+\gamma c_i$ captures novelty, enablement, and clarity. The RL controller updates Q iteratively to align system predictions with outcomes, achieving convergence when disclosure variance is less than 5%. Outputs include detected invention candidates, generated drafts, and stabilized quality metrics. Conventional scoring methods (for novelty), such as $n_i=1-\max_k \mathrm{sim}(x_i, R_k)$, rely on static similarity thresholds and lack reinforcement calibration because there is no dynamic scoring feedback loop linking section-level metrics with patent review outcomes. In contrast, the systems and techniques described herein continuously monitor enterprise data, detect new ideas, score each of the new ideas, and automatically draft patent disclosures. In some cases, the systems and techniques may file the drafted disclosure as a provisional patent application. The systems and techniques improve over time by learning from patent approvals.

The systems and techniques use a closed-loop RL framework using four stages: detection, scoring, drafting, and feedback calibration. The systems and techniques assign each item that is detected a composite quality score and refine detection and drafting thresholds through reinforcement signals. The optimization objective maximizes expected reward $E[r_t]=w_1P_t+w_2R_t-w_3F_t$ under the constraint Var(Q_i)<0.05 and T_conv<12. Section-level scoring follows Q_i=αn_i+βe_i+γc_i, with iterative updates Q_i(t+1)=Q_i(t)+η(r_t−Q_i(t)). This reinforcement-calibrated scoring loop stabilizes disclosure quality, ensuring quantifiable convergence and reproducible drafting accuracy. Unlike conventional tools, the systems and techniques continuously learn to improve detection, scoring, and drafting performance by learning what successful disclosures look like from previous outcomes.

The systems and techniques include (1) reinforcement-calibrated scoring for continuous improvement, (2) section-level evaluation of novelty, enablement, and clarity, (3) closed-loop convergence control, and (4) measurable correlation between quality scores and patent outcomes. These create a self-learning patent discovery system that optimizes disclosure quality at scale. The reinforcement-based scoring feedback dynamically tunes system parameters to maximize disclosure success probability.

The systems and techniques use an architecture that includes: (1) an encoder to transform inputs into latent vectors, (2) an AI-based analyzer that applies a particular policy π_θ(a|v_i), (3) an AI-based calibrator to dynamically adjust detection thresholds r, (4) an AI-based scoring algorithm to determine section-level quality metrics for each idea, and (5) an AI-based disclosure generator to generate a patent disclosure (text and images). The AI uses reinforcement learning that includes an expected reward function to balance precision, recall, and false positive rate.

In addition to drafting patent disclosure documents that can be used to file a provisional patent application, the systems and techniques learn and improve over time. In particular, the systems and techniques continually improve idea detection, scoring, and drafting performance by learning what successful disclosures look like from past outcomes. The systems and techniques include: (1) reinforcement-calibrated scoring for continuous improvement, (2) section-level evaluation of novelty, enablement, and clarity, (3) closed-loop convergence control, and (4) measuring a correlation between quality scores and patent outcomes. All of these combine to create a self-learning patent discovery ecosystem that provides disclosure quality at scale. The reinforcement-based scoring feedback dynamically tunes system parameters to maximize disclosure success probability. Empirical metrics demonstrate recall>92%, time-to-filing reduced from 10 to 3 days, cost reduction 40%, and convergence within 12 iterations.

A mathematical model is described below to describe the continuous learning of the systems and techniques described herein. An analyzer observes company data (e.g., code, documents, diagrams, logs, and the like), determines whether an idea (potential invention) is present, assigns a score to the idea, learns from feedback, and adjusts future determination. This learning cycle ensures that the AI not only detects inventive ideas but improves continuously based on feedback. The feedback provided to the AI may include feedback provided by an internal patent review committee. Many enterprises have an internal patent review committee made up of engineers (typically, engineers that are co-inventors on one or more patents) that evaluate patent idea submissions based on multiple criteria. The patent review committee may evaluate ideas that the AI has identified and for which the AI has created patent disclosures and these evaluations may be provided as feedback (input) to the AI to improve the AI's ability to identify ideas that are likely patentable. In addition, after the patent review committee has approved the AI-generated disclosure of an AI-identified idea, the resulting patent may be provided as feedback to the AI. For example, the AI may learn from the resulting patent by comparing the AI-created disclosure with the final patent application, reviewing the Examiner's rejections provided in one or more office actions, reviewing the amendments made by a prosecuting patent practitioner (agent or attorney) to overcome the rejections, and so on. For example, if the Examiner provided a 101 ("Abstract idea") rejection and the patent practitioner made specific claim amendments to over come the 101 rejection, then the AI may learn from this and include support for such claim amendments.

Mathematical Model

Invention probability: Each input artifact x_i (code, document, diagram, log) is processed by a multi-modal neural network f_θ to estimate invention likelihood:

$$p\_i = f\_\theta(x\_i)$$

where p_i represents the probability that the artifact x_i corresponds to a novel invention.

Section-Level Quality Scores: Each disclosure that is generated is evaluated across three metrics: novelty (n), enablement (e), and clarity (c) as follows:

$$Q\_i = \alpha n\_i + \beta e\_i + \gamma c\_i$$

where α+β+γ=1.

This equation produces a quantifiable measure of disclosure quality reflecting technical strength and communication clarity.

Reinforcement Update Rule: The controller updates each disclosure's quality score iteratively based on feedback reward r_t:

$$Q\_i\hat{}(t+1) = Q\_i\hat{}(t) + \eta(r\_t - Q\_i\hat{}(t))$$

where η is the learning rate controlling how quickly the system adapts.

Reward Function: The reward is derived from measurable system performance indicators:

$$r\_t = w_1 P\_t + w_2 R\_t - w_3 F\_t$$

where P_t=precision, R_t=recall, and F_t=false positives. Weights $w_1$, $w_2$, and $w_3$ allow business control over accuracy versus discovery breadth.

Convergence Criteria: Training is considered converged when quality variance falls below 5% and performance stabilizes:

$$\mathrm{Var}(Q\_i) < 0.05, T\_\mathrm{conv} < 12$$

indicating consistent disclosure quality across iterations.

TABLE 1

Definitions

| Symbol | Description |
|---|---|
| x_i | Input artifact (code, document, diagram, log, etc.) |
| p_i | Probability that artifact represents an invention |
| f_θ | Multi-modal AI model with trainable parameters θ |
| n_i, e_i, c_i | Section-level quality scores (novelty, enablement, clarity) |
| Q_i | Composite disclosure quality score |
| η | Learning rate controlling reinforcement step size |
| r_t | Reinforcement feedback signal |
| $w_1$, $w_2$, $w_3$ | Reward weights for precision, recall, and false positives |

TABLE 1-continued

| Definitions | |
|---|---|
| Symbol | Description |
| Var(Q_i) | Variance in disclosure quality across iterations |
| T_conv | Training iterations required for convergence |

The mathematical model above provides a measurable link between AI performance and disclosure quality. The system continuously optimizes thresholds and stabilizes Q_i within ±5% variance. Each section of a disclosure is evaluated for overall quality, aiding compliance and review. By improving the quality of the patent disclosures, a reduction of up to 40% in manual review time (by members of the patent review committee) may be achieved, the improved patent disclosures may result in up to 70% faster time-to-filing, and the AI-generated patent disclosures may result in up to a 15% increase in patent approvals. The mathematical model enables the systems and techniques to meet NIST SP 800-193 and IEC 62443 standards by providing traceable, auditable AI reasoning steps.

EXAMPLE

Assume a large engineering team is working on new Kubernetes edge modules. Every day, developers push new code, design diagrams, and architecture documents into GitHub, Confluence, and Slack. Hidden within that activity are many small ideas, some of which may be patentable, but nobody realizes it because they seem like 'routine improvements.' The systems and techniques described herein periodically (e.g., hourly, daily, or the like) developer commits, documentation, diagrams, and the like and detects ideas that may be novel. For example, the team may have created a new container orchestration policy that has not been used before. The systems and techniques scores idea in terms of novelty, clarity, and enablement and automatically drafts a disclosure using a template (e.g., Anaqua® or another type of patent management system compliant template). The systems and techniques learn from patent committee reviewers' feedback, from the patent prosecution history, and the resulting patent and automatically adjusts idea scoring and disclosure drafting. Through reinforcement feedback, the systems and techniques continuously calibrate the scoring model. The systems and techniques converge toward reviewer-validated quality standards, achieving variance below 5% between predicted and actual disclosure ratings.

ReAct Agent Integration Enhancement

The system may use reinforcement learning (RL), that includes scoring each draft patent disclosure that the system produces, analyzing review committee comments, reviewing prosecution history, and the like to improve the patent disclosures, over time. However, RL may not always understand the meaning of sentences or notice missing explanations. Therefore, a ReAct reasoning agent may be added. The ReAct agent is a tool that checks its own reasoning and tells the system what may be improved. Together, RL and ReAct become a team with one creating measurable improvement and the other providing clarity and logic. From a system perspective, RL provides quantitative scoring (numerical quality metrics), while the ReAct agent provides qualitative insight (logical reasoning and critique). This combination creates a hybrid feedback loop where structured metrics and natural-language critique jointly influence system updates. The ReAct agent may use chain-of-thought reasoning (CoT), self-consistency checks, and linguistic evaluation to identify missing justifications, unclear steps, or logical gaps in the draft. These insights are converted into a numerical CritiqueScore_t, which becomes part of the RL reward update.

Hybrid Reinforcement+ReAct Feedback Model

The system may extend the Reinforcement Learning (RL) reward model to incorporate ReAct-generated critique (feedback) signals:

$$r\_t=w_1P\_t+w_2R\_t-w_3F\_t+w_4\text{CritiqueScore}\_t$$

Where CritiqueScore_t is derived from: CoT depth (logical completeness), self-consistency between multiple ReAct rollouts, alignment with reviewer expectations, and clarity and precision improvements. This hybrid reward structure combines numerical convergence properties with linguistic refinement signals.

ReAct-Augmented Drafting Pipeline

The initial draft may be generated by an LLM disclosure generator. The ReAct agent may perform iterative reasoning (thought→action→observation). The ReAct agent may generate a self-critique describing gaps, unclear reasoning, and/or missing rationale. A linguistic critique may be transformed into a numerical CritiqueScore_t. The RL controller may update a quality score Q_i(t) using the hybrid reward. The draft patent disclosure may be regenerated if Q_i(t+1) does not meet a convergence threshold.

Mathematical Extension

With ReAct integration, the fundamental RL update equation may be:

$$Q\_i(t+1)=Q\_i(t)+\eta(r\_t-Q\_i(t))$$

In this equation, the reward r_t includes a linguistically derived critique term. This blends structured quantitative metrics with unstructured natural-language review signals, enabling a more expressive and adaptive quality-improvement loop. Several of the unique aspects include using self-critique as a quantifiable optimization signal, transforming chain-of-thought reasoning into numeric reward components, blending linguistic reasoning with mathematically provable convergence behavior, implementing an end-to-end pipeline combining multi-modal listening, RL scoring, and ReAct (also spelled "react" herein) refinement.

Thus, the systems and techniques described herein extend beyond AI-assisted drafting by including a reinforcement-calibrated framework for identifying potential inventions from operational system behavior in an enterprise. The systems and techniques analyze machine-generated artifacts, including runtime logs, telemetry, execution traces, and other system-level signals, to identify technical activity indicative of potentially inventive concepts, evaluate the potential using quantitative evaluation metrics, and adjust detection and scoring parameters based on patent review committee comments and/or prosecution history (when a corresponding patent application is filed). The generation of a draft patent disclosure and/or patent application may be performed as a downstream function of this iterative discovery and calibration process.

As a first example, one or more processors gather data in a private network that is associated with an enterprise and convert the data into a set of vector embeddings. For example, the data may include: (i) software code commits to a code repository, (ii) documents in a document repository including design documents and marketing documents, (iii) digital records including logs, metrics, and key performance indicators (KPIs), or (iv) any combination thereof.

An artificial intelligence (AI) executed by the one or more processors, based on one or more policies, determines a probability that individual vector embeddings in the set of vector embeddings include a patentable idea. Converting the data into the set of vector embeddings may include: selecting a particular data item from the data, determining a type of content associated with the particular data item, selecting, based on the type of content, a particular encoder from a set of encoders, and converting, using the particular encoder, the particular data item into a vector embedding for inclusion in the set of vector embeddings. The patentable idea is added to a set of patentable ideas based on determining that the probability is greater than a predetermined patentability threshold. The one or more processors perform a search of external databases for individual patentable ideas in the set of patentable ideas, thereby creating search results. For example, the external databases may include: one or more patent databases, one or more academic databases that include scholarly papers, or any combination thereof. In some cases, a reasoning and acting (react) agent may perform the search of external databases for individual patentable ideas in the set of patentable ideas. The one or more processors create a score for individual patentable ideas in the set of patentable ideas based on the search results. A large language model executed by the one or more processors creates a patent disclosure document for individual patentable ideas having an associated score greater than a predetermined patent disclosure threshold. The patent disclosure document is provided to a patent review committee.

After receiving comments from individual members of the patent review committee, the comments are provided as reinforcement learning to: (1) the artificial intelligence to improve an ability of the artificial intelligence to detect patentable ideas and (2) the large language model to improve a quality of the patent disclosure document generated by the large language model. The one or more processors may automatically file the disclosure as a provisional patent application with a patent office of a particular country. The one or more processors may retrieve, from the patent office of the particular country, a prosecution history of a non-provisional patent application claiming priority from the provisional patent application after the non-provisional patent application has issued as a patent and provide the prosecution history as reinforcement learning to the large language model to improve the quality of the patent disclosures generated by the large language model.

As a second example, a computing device that includes one or more processors and one or more non-transitory computer readable media storing instructions executable by the one or more processors may perform various operations. The operations include gathering, from a private network, data in a private network that is associated with an enterprise. The data may include: structured data, unstructured data, or a combination of both. The operations include converting the data into a set of vector embeddings. Converting the data into the set of vector embeddings may include selecting a particular data item from the data, determining a type of content associated with the particular data item, selecting, based on the type of content, a particular encoder from a set of encoder, and converting, using the particular encoder, the particular data item into a vector embedding for inclusion in the set of vector embeddings. The operations include determining, by an artificial intelligence and based on one or more policies, a probability that individual vector embeddings in the set of vector embeddings include a patentable idea. The operations include adding the patentable idea to a set of patentable ideas based on determining that the probability is greater than a predetermined patentability threshold. The operations include performing a search of external databases for individual patentable ideas in the set of patentable ideas to create search results. The external databases may include one or more patent databases, one or more academic databases that include scholarly papers, or both. In some cases, a reasoning and acting (react) agent may perform the search of external databases for individual patentable ideas in the set of patentable ideas. The operations include determining a score for individual patentable ideas in the set of patentable ideas based on the search results. The operations include creating, by a large language model, a patent disclosure document for individual patentable ideas with the score greater than a predetermined patent disclosure threshold. The operations include providing the patent disclosure document to a patent review committee. The operations include receiving comments from individual members of the patent review committee. The operations include providing the comments as reinforcement learning to: (1) the artificial intelligence to improve an ability of the artificial intelligence to detect patentable ideas and (2) the large language model to improve a quality of the patent disclosure document generated by the large language model. The operations may include automatically filing the disclosure as a provisional patent application with a patent office of a particular country. The operations may include retrieving, from the patent office of the particular country, a prosecution history of a non-provisional patent application claiming priority from the provisional patent application after the non-provisional patent application has issued as a patent. The operations may include providing the prosecution history as reinforcement learning to the large language model to improve the quality of the patent disclosures generated by the large language model.

As a third example, one or more non-transitory computer readable media storing instructions executable by one or more processors perform various operations. The operations include gathering, from a private network, data in a private network that is associated with an enterprise. The data may include: (i) software code commits to a code repository, (ii) documents in a document repository including design documents and marketing documents, (iii) digital records including logs, metrics, and key performance indicators (KPIs), or (iv) any combination thereof. The operations include converting the data into a set of vector embeddings. For example, converting the data into the set of vector embeddings may include: (i) selecting a particular data item from the data, (ii) determining a type of content associated with the particular data item, (iii) selecting, based on the type of content, a particular encoder from a set of encoder, and (iv) converting, using the particular encoder, the particular data item into a vector embedding for inclusion in the set of vector embeddings. The operations include determining, by an artificial intelligence and based on one or more policies, a probability that individual vector embeddings in the set of vector embeddings include a patentable idea. The operations include adding the patentable idea to a set of patentable ideas based on determining that the probability is greater than a predetermined patentability threshold. The operations include performing a search of external databases for individual patentable ideas in the set of patentable ideas to create search results. The operations include determining a score for individual patentable ideas in the set of patentable ideas based on the search results. The operations include creating, by a large language model, a patent disclosure document for individual patentable ideas with the score greater than a predetermined patent disclosure threshold. The operations include providing the patent disclosure document to a patent review committee. The operations include receiving comments from individual members of the patent review committee. The comments may rank individual patent disclosure documents based at least in part on: novelty, enablement, and clarity. The operations include providing the comments as reinforcement learning feedback to the artificial intelligence to improve a quality of the patent disclosure document generated by the large language model. The operations may include automatically filing the disclosure as a provisional patent application with a patent office of a particular country. The operations may include retrieving, from the patent office of the particular country, a prosecution history of a non-provisional patent application claiming priority from the provisional patent application after the non-provisional patent application has issued as a patent and providing the prosecution history as reinforcement learning feedback to the large language model to improve the quality of the patent disclosures generated by the large language model.

FIG. 1 is a block diagram of a system 100 that includes an analyzer and a disclosure generator, according to some embodiments. The system 100 includes a private network 102 (e.g., associated with an enterprise) coupled to external sites via a network 108. While a single network 108 is illustrated, it should be understood that the network 108 may include multiple networks using a variety of technologies. The private network 102 may use the network 108 to access external databases including, for example, patent databases 160 and publication databases 162. The patent databases 160 may include, for example, Google patents, eSpaceNet (European database), the United States Patent and Trademark Office (USPTO) database, Justia, and the like. The publication databases 162 may include, for example, Google Scholar, Scopus, Web of Science, Science Direct, IEEE Xplorer, ProQuest, and the like.

The private network 102 includes a representative computing device 104, such as a server, that monitors and analyzes activities occurring within the private network 102 to determine whether the activities include potentially patentable subject matter. The computing device 104 includes an analyzer 110 that analyzes data 122 gathered from activities that occur within the private network 102. For example, the data 122 may include code commits 124 made to a code repository 112. The data 122 may include documents added to a document repository 114, including, for example, design documents 126 that document the design of various code residing in the code repository 112, marketing documents 128, and the like. The data 122 may include digital records 116 such as, for example, logs, metrics, key performance indicators (KPIs), and the like.

The analyzer 110 includes an artificial intelligence (AI) 120 that performs an analysis of the data 122. Based on the analysis, the AI 120 extracts one or more ideas 138(1) to 138(N). The AI 120 may create a score 140(1) to 140(N) corresponding to each of the ideas 138(1) to 138(N). For example, the scores 140 may be used to rank the ideas 138 to determine which ideas 138 to pursue as patents. The scores 140 may be based on a novelty of the corresponding idea 138, a likelihood of obtaining a patent, an importance of the idea 138 to the enterprise (e.g., is the idea 138 relevant to the enterprise's products and/or services), and so on.

In some cases, one or more encoder(s) 130 may be used to create embeddings 132 based on the data 122. The AI 120 may base the scores 140 on one or more policies 134. For example, the policies may indicate that the scoring is to be done based on novelty, a likelihood of obtaining a patent and importance of the idea to the enterprise, and so on. A reasoning and acting (react) agent 164 and a reinforcement learning (RL) controller 166 may provide additional input to the AI 120. The encoder(s) 130 may be content specific. For example, a first encoder may be used for code commits from the code repository 112, a second encoder may be used for documents from the document repository 114, and a third encoder may be used for the digital records 116. Of course, this may be further broken down, with a particular encoder used for each programming language in the code repository 112. Different types of documents may be processed using a different encoder, such as one encoder for .docx files, another encoder for .pptx files, and so on. Each type of digital record may be processed using a particular type of encoder, such as a first encoder for logs, a second encoder for metrics, and so on. In some cases, the encoder may be specific to a particular type of digital record, such as a first encoder for the output of Splunk®, a second encoder for the output of Datadog®, a third encoder for the output of New Relic®, and so on.

The react agent 164 combines a Large Language Model's (LLM) reasoning with the ability to take external actions (like using tools or APIs) in an iterative loop, allowing the react agent 164 to solve complex, multi-step problems by thinking, acting, observing results, and refining its plan. The react agent 164 uses "Thought," "Action," "Observation" steps to plan and execute tasks, improving accuracy and reducing hallucinations by grounding responses in external data. Thought (Reasoning): the react agent 164 analyzes a problem, breaks it down, and decides on the next logical step or tool to use (e.g., "Perform a search of patent databases 160"). Action (Acting): The react agent 164 uses a specific tool (e.g., patent database search engine with the chosen parameters (e.g., idea 138(N)). Observation (Feedback): The result from the tool is returned to the react agent 164 (e.g., "the search results from the patent databases indicate that there have been few attempts to address this issue"). Repeat: The react agent 164 uses this new information to form another "Thought," deciding if it has enough info for the final answer or needs another Action (e.g., search a different patent database, search a publication database, or the like).

To determine the score 140 for each of the ideas 138, the AI 120 may send search requests to the patent databases 160 and to the publication databases 162, such as a representative request 152, and receive a representative response 154 for each request sent to the patent databases 160 and/or the publication databases 162. The AI 120 may use the response 154 to determine the score 140. For example, if the response 154 indicates that the corresponding idea 138 is relatively novel (few search results) and/or solves a well-known problem that many have had difficulty addressing (a large number of results describing difficulties finding a solution), then the AI 120 may generate a higher score for the corresponding idea 138. In contrast, if the response 154 indicates that the corresponding idea 138 is relatively well-known and/or a number of solutions are available to address the issue, then the AI 120 may generate a lower score for the corresponding idea 138, thereby acknowledging that the idea 138 is not likely to get a patent and/or not likely to be particularly valuable because other solutions are already available.

The encoder 130 transforms input data 122 into latent vectors (embeddings 132). The AI-based analyzer 110 applies a particular policy π_θ(a|v_i) and uses an AI-based calibrator (RL controller 166) to dynamically adjust detection thresholds 136 τ. The AI 120 uses scoring criteria 142 to determine section-level quality metrics for each idea. For example, a disclosure generator 118 (a type of large language model (LLM)) may take individual ideas 138 and generate patent disclosures 144(1) to 144(N) (each disclosure 144 includes text and images). Each disclosure 144 may have multiple sections, including novelty 146, enablement 148, and clarity 150. The AI 120 uses a reinforcement learning (RL) controller 166 that includes an expected reward function to balance precision, recall, and false positive rate.

In some cases, at least a portion of the disclosures 144(1) to 144(N) may be reviewed by humans who are part of a patent review committee and who provide comments 168. In other cases, a prosecution history (PH) of a patent filing 156 may be retrieved. The comments and/or PH 168 may be used by the reinforcement learning controller 166 to provide feedback to the AI 120 to improve the disclosures 144 and to adjust the policies 134 and thresholds 136. For example, to save money by reducing patent filings, the comments 168 may request that disclosures 144 be created for ideas 138 that can (i) potentially increase sales of existing products and/or existing services, or (ii) reduce costs for existing products and/or existing services, and to avoid creating disclosures for ideas related to new products and/or new services.

In some cases, the comments and/or PH 168 may be used to determine which of the disclosures 144 are filed as patent applications, such as a representative patent filing 156. In other cases, the disclosure generator 118 may use at least some of the criteria 142 to determine which of the disclosures 144 are automatically filed as patent applications in the patent filing 156. For example, the disclosure generator 118 may automatically (without human interaction) file a portion of the disclosures as patent applications. The patent filing 156 may be a provisional application or a non-provisional application.

The digital records 116 include logs and other system-generated sources that are automatically created during software and infrastructure operations, which may reveal new technical behaviors before they are formally documented. By analyzing these machine-produced digital records 116, the analyzer 110 can detect potentially patentable innovations directly from the operations of the systems used in an enterprise (e.g., in the private network 102).

The digital records 116 refers to records that computers and software systems create while they are running, along with other routine technical materials engineers produce as part of their daily work. For example, when software runs on servers or in the cloud, the system records actions taken, errors encountered, resource usage, and component interactions. These records are called logs. These logs are important for invention discovery because new technical ideas often first appear in system behavior rather than in formal documentation. The introduction of a new optimization method, a new recovery process, a new automated control rule, or the like may manifest in runtime behavior long before anyone recognizes it as potentially patentable. The digital records 116 include engineering materials, such as system metrics, test results, design files, and technical discussions that are produced in a tech-oriented enterprise. These sources, the code commits 124, the documents in the document repository 114, and the digital records 116 capture what the enterprise does in practice, not just what was intended in design. Thus, the data 122 includes machine-generated and system-generated technical artifacts produced during software development and runtime operation, in addition to human-authored code and documents. The digital records 116 may be generated by applications, microservice runtimes, Kubernetes, orchestration control planes, cloud infrastructure, hardware devices, deployment systems, observability platforms, monitoring platforms, security platforms, and the like.

In an enterprise, many potential inventions may first appear as new runtime behaviors and control decisions, such as novel scheduling or autoscaling logic, new fault-recovery or failover mechanisms, new security enforcement workflows, new resource-optimization strategies, or the like. These behaviors are typically recorded in state-transition logs, control-decision traces, retry and failover sequences, orchestration event streams, system telemetry, performance metrics, execution traces, application programming interfaces (API), call graphs. configuration and deployment manifests, test and simulation outputs, architecture diagrams and process flows, ticketing, incidents, change-management records, and audio and/or video transcripts from technical design reviews.

The analyzer 110 analyzes the data 122 that may include time-series signals, state-transition graphs, control-flow sequences, and multi-modal technical artifacts to detect unrecognized technical behaviors that may constitute patentable inventions. This process enables automated invention discovery directly from real system operation, rather than relying only on voluntary inventor submissions or static written disclosures. Observability data 122 helps discover unfiled patentable ideas. Some of the observability tools may include, for example, Splunk®, Datadog®, New Relic®, Dynatrace®, Elastic®, Dell® APEX® and the like.

Thus, an artificial intelligence (AI) may analyze, at a predetermined time interval (e.g., every day, every week, every month, or the like) data generated by various systems in an enterprise. The data may include (i) software code commits, (ii) various documents such as, design documents, marketing documents, and the like, and (iii) digital records, such as logs, metrics, key performance indicators (KPI), and the like. Based on analyzing the data, the AI may identify one or more ideas and rank them in terms of patentability. In some cases, the ranking may be derived from performing searches on one or more patent databases, and one or more publication databases. For example, an issue for which a solution has been the subject of numerous patent applications and/or publications may be ranked relatively low if the solution is relatively inexpensive and easily implemented. On the other hand, if the issue has solutions that are relatively expensive or difficult to implement, then an idea that addresses the issue may be ranked relatively high. A disclosure generator may create disclosures for the top X (X>O) ideas (e.g., ideas having an associated score greater than a predetermined amount). Each disclosure may include text and one or more drawings. Each disclosure may be ranked according to novelty, enablement, and clarity. In some cases, the disclosures may be reviewed by a patent review committee that is internal to the enterprise and the comments provided as reinforcement learning to the AI. In some cases, one or more of the disclosures may be filed as a patent application, either as a provisional or as a non-provisional application. In this way, an enterprise can identify and potentially patent ideas that have been implemented within the enterprise to create improvements to internal products and services.

Figure 2:
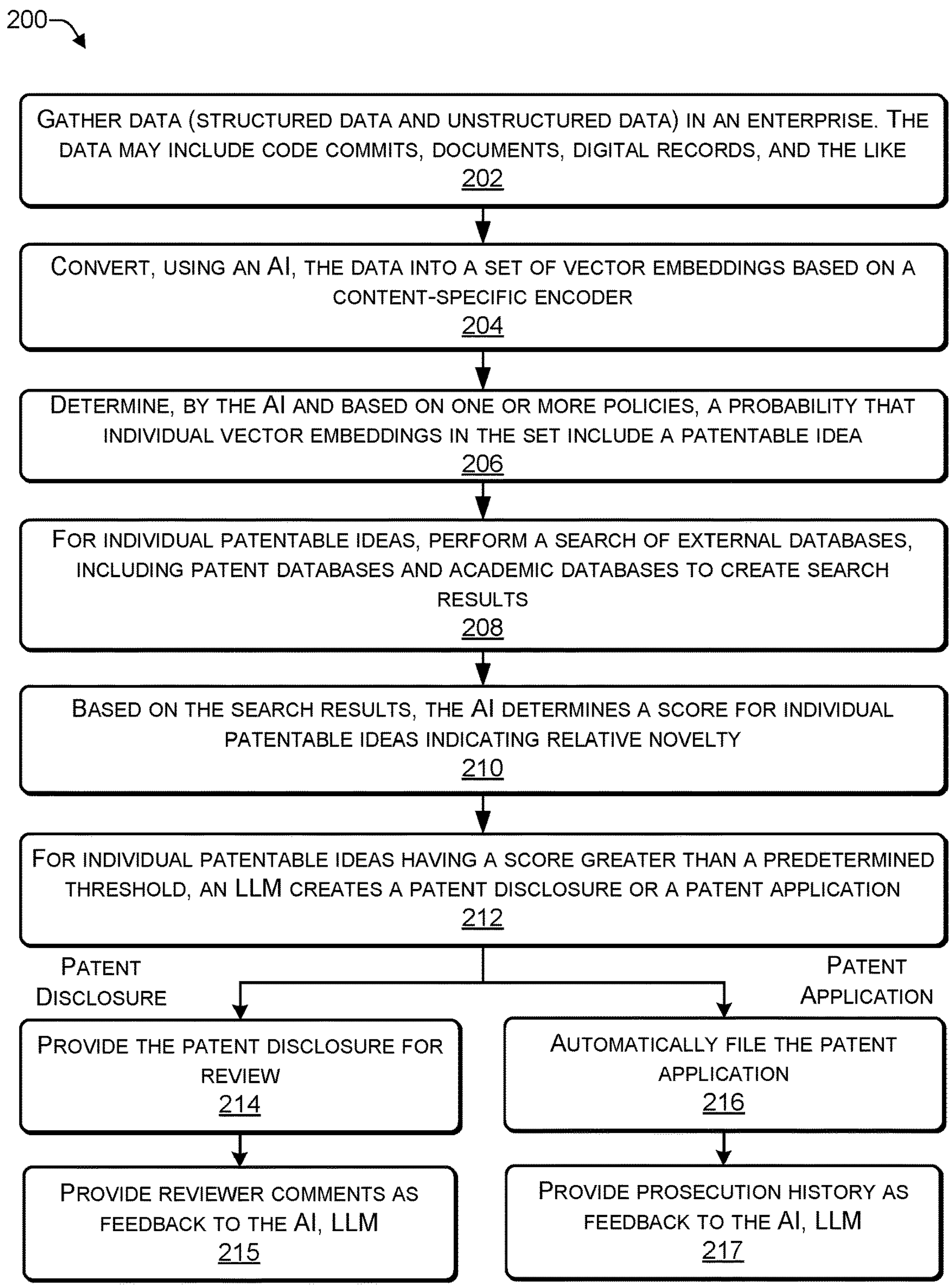
FIG. 2 is a flowchart of a process that includes determining a score for individual patentable ideas, according to some embodiments.
Figure 3:
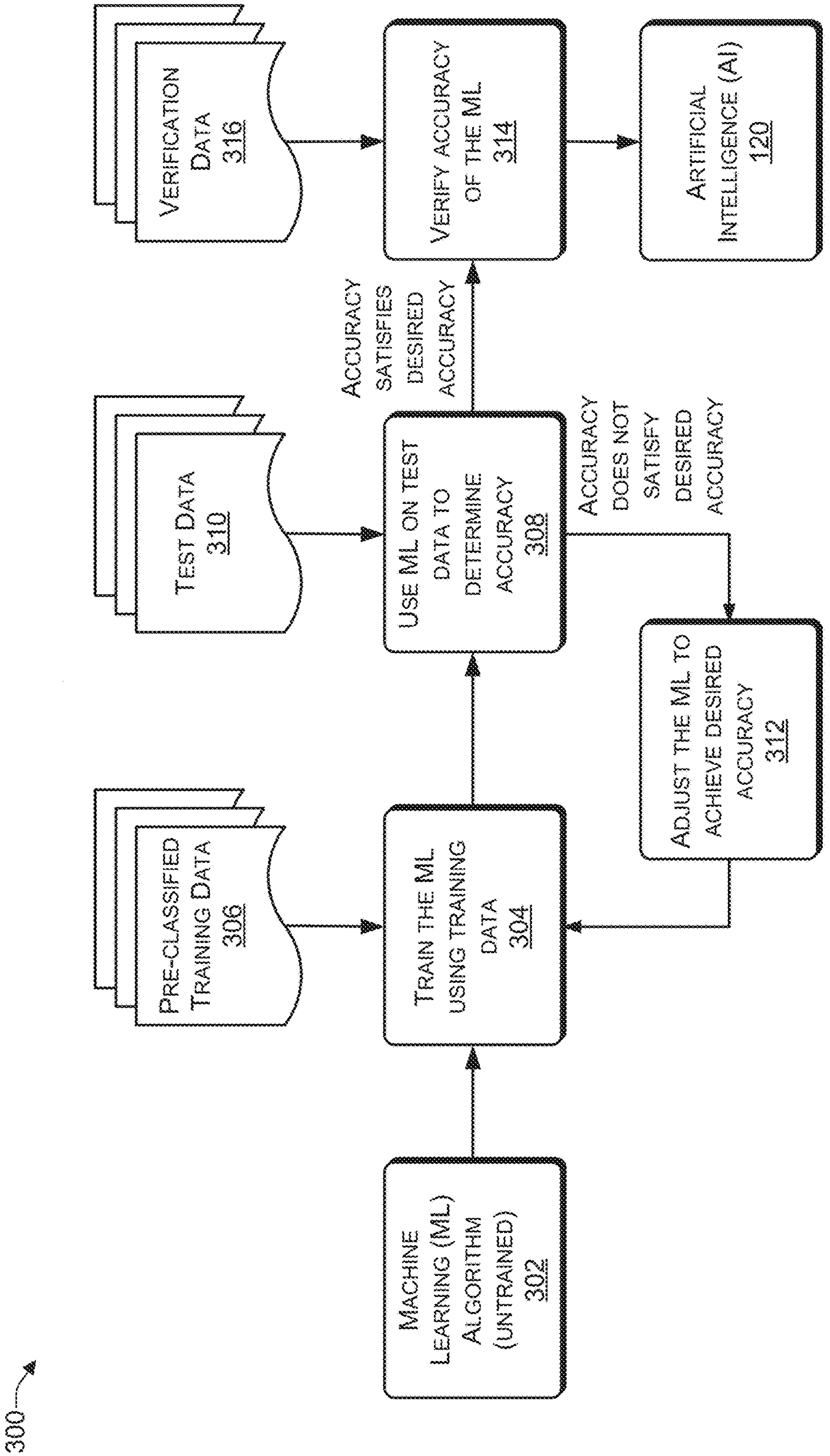
FIG. 3 is a flowchart of a process that includes training a machine learning algorithm to create an artificial intelligence (AI), according to some embodiments.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1 as described above, although other models, frameworks, systems and environments may be used to implement these processes.

FIG. 2 is a flowchart of a process 200 that includes determining a score for individual patentable ideas, according to some embodiments. The process 200 may be performed by the analyzer 110 of FIG. 1.

At 202, the process may gather data (structured data and unstructured data) in an enterprise. The data may include code commits, documents, digital records, and the like. At 204, the process may use an AI to convert the data into a set of vectors embeddings based on a content specific encoder. At 206, the process may use the AI to determine, based on one or more policies, a probability that individual vector embeddings in the set include a patentable idea. At 208, for individual patentable ideas, the process may perform a search of external databases, including patent databases and academic paper databases, to create search results. At 210, based on the search results, the process may use the AI to determine a score for individual patentable ideas, including relative novelty. At 212, for individual patentable ideas having a score greater than a predetermined threshold, the process may use an LLM to create a patent disclosure or patent application. If a patent disclosure is created, at 212, then the process may proceed to 214, where the patent disclosure is provided to a patent review committee for review and, at 215, the reviewer comments are provided as feedback to the AI (as part of reinforcement learning). If a patent application is created, at 212, then the process may proceed to 216, where the patent application is filed and, at 217, the prosecution history is provided as feedback to the AI and the LLM.

For example, in FIG. 1, the analyzer 110 may gather the data 122 (structured data and unstructured data) in an enterprise. The data 122 may include code commits 124, documents 114, digital records 116, and the like. The AI 120 may convert the data 122 into a set of vectors embeddings 132 based on content specific encoders 130. The AI 120 determines, based on one or more policies 134, a probability that individual vector embeddings 132 include a patentable idea. For individual patentable ideas, the analyzer 110 may send a search request 152 to external databases, including patent databases 160 and academic paper databases 162, and receive a response 154. Based on the response 154, the AI 120 may determine a score for individual patentable ideas 138, including relative novelty. For individual patentable ideas 138 having a score greater than a predetermined threshold, the disclosure generator 118 (LLM) may create a patent disclosure or a patent application. If a patent disclosure is created, then the patent disclosure is provided to a patent review committee for review and the reviewer comments 168 are provided as feedback to the AI 120 (as part of reinforcement learning). If a patent application is created then a patent filing 156 is made and a prosecution history (PH) 168 of the patent filing 156 is provided as feedback to the AI.

Thus, an artificial intelligence (AI) may analyze data that is internally generated in an enterprise. The data may include (i) software code commits, (ii) various documents such as, design documents, marketing documents, and the like, and (iii) digital records, such as logs, metrics, key performance indicators (KPI), and the like. Based on analyzing the data, the AI may identify one or more ideas and rank them in terms of patentability. The ranking may be derived from performing searches on one or more patent databases, and/or one or more publication databases. A disclosure generator may create disclosures for the top X (X>0) ideas (e.g., ideas having an associated score greater than a predetermined amount). Each disclosure may include text and one or more drawings. Each disclosure may be ranked according to novelty, enablement, and clarity. In some cases, the disclosures may be reviewed by a patent review committee that is internal to the enterprise and the comments provided as reinforcement learning to the AI. In other cases, one or more of the disclosures may be filed as a patent application, either as a provisional or as a non-provisional application and the prosecution history provided as feedback to the AI. In this way, an enterprise can identify and potentially patent ideas that have been implemented within the enterprise to create improvements to internal products and services.

FIG. 3 is a flowchart of a process 300 that includes training a machine learning algorithm to create an artificial intelligence (AI), according to some embodiments. For example, the process 300 may be performed to create the AI 120 of FIG. 1, the disclosure generator 118, or any other artificial intelligence described herein.

At 302, a machine learning algorithm (e.g., software code that has not yet been trained) may be created by one or more software designers. At 304, the machine learning algorithm may be trained using pre-classified training data 306 (e.g., patent disclosures, patent applications, issued patents, and the like). For example, the training data 306 may have been pre-classified by humans, by machine learning, or a combination of both. After the machine learning has been trained using the pre-classified training data 306, the machine learning may be tested, at 308, using test data 310 to determine an accuracy of the machine learning. For example, in the case of a classifier, the accuracy of the classification may be determined using the test data 310.

If an accuracy of the machine learning does not satisfy a desired accuracy (e.g., 95%, 98%, 99% accurate), at 308, then the machine learning code may be modified (e.g., adjusted), at 312, to achieve the desired accuracy. For example, at 312, the software designers may modify the machine learning software code to improve the accuracy of the machine learning algorithm. After the machine learning has been tuned, at 312, the machine learning may be retrained, at 304, using the pre-classified training data 306. In this way, 304, 308, 312 may be repeated until the machine learning is able to classify the test data 310 with the desired accuracy.

After determining, at 308, that an accuracy of the machine learning satisfies the desired accuracy, the process may proceed to 314, where verification data 316 may be used to verify an accuracy of the machine learning. After the accuracy of the machine learning is verified, at 314, the artificial intelligence 120, which has been trained to provide a particular level of accuracy may be used.

Figure 4:
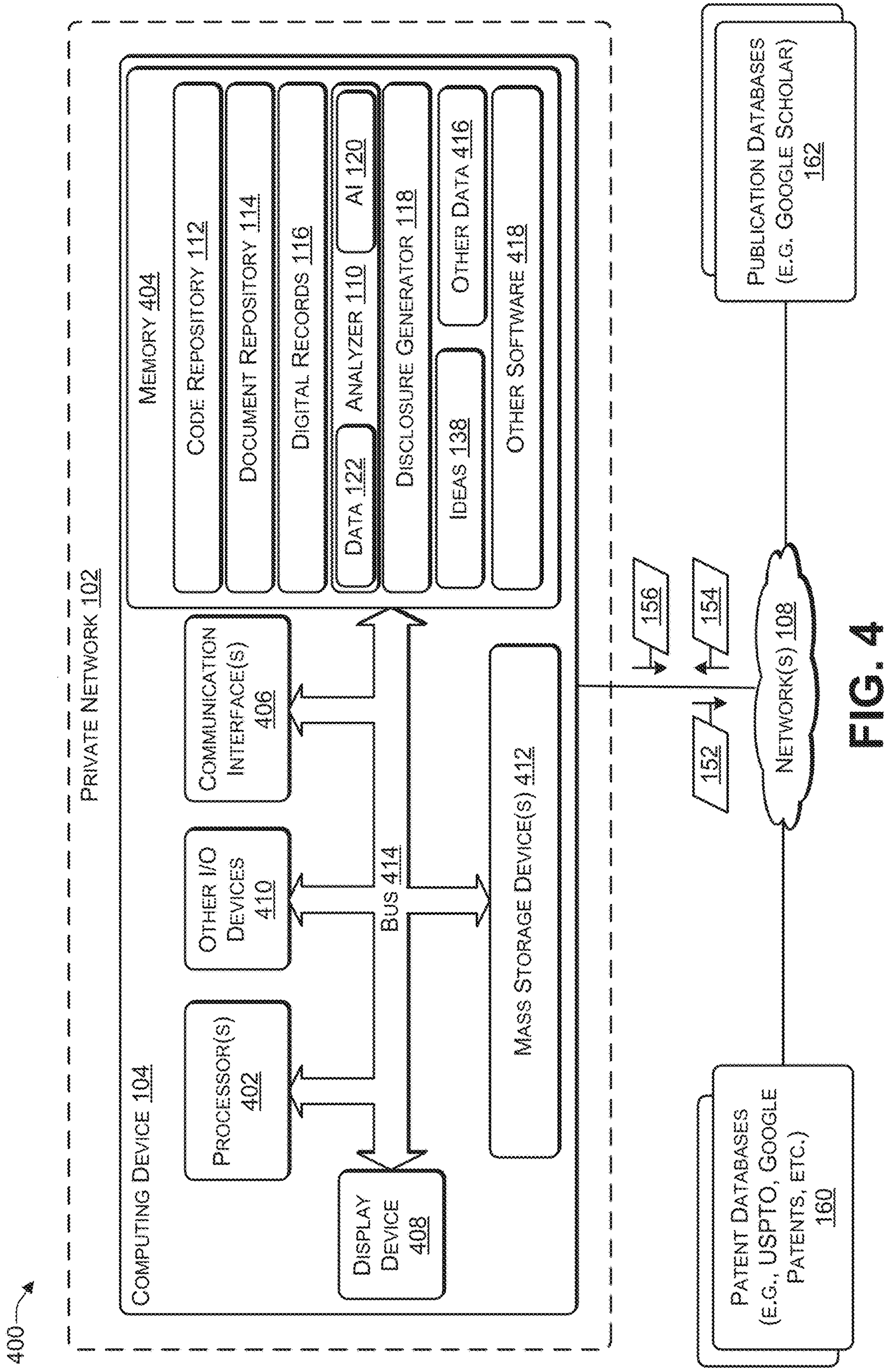
FIG. 4 illustrates an example configuration of a computing device that can be used to implement the systems and techniques described herein.

FIG. 4 illustrates an example configuration of a computing device 400 that can be used to implement the systems and techniques described herein, such as the analyzer 110 and the disclosure generator 118 of FIG. 1.

The computing device 400 may include one or more processors 402 (e.g., central processing unit (CPU), graphics processing unit (GPU), or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 402 are one or more hardware devices that may include a single processing unit or multiple processing units, all of which may include single or multiple computing units or multiple cores. The processors 402 may include a GPU that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 are configured to fetch and execute computer-readable instructions stored in the memory 404, mass storage devices 412, and other types of non-transitory computer-readable media.

Memory 404 and mass storage devices 412 are examples of non-transitory computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 404 and mass storage devices 412 may be collectively referred to as memory or computer storage media herein and include any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network(s) 108. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store the code repository 112, the document repository 114, the digital records 116, the analyzer 110, the disclosure generator 118, other data 416, and other software 418.

Thus, the analyzer 110 may use the AI 120 to analyze, at a predetermined time interval (e.g., every day, every week, every month, or the like) data 122 generated by various systems in an enterprise (e.g., in the private network 102). The data 122 may include (i) software code commits, (ii) various documents such as, design documents, marketing documents, and the like, and (iii) digital records, such as logs, metrics, key performance indicators (KPI), and the like. Based on analyzing the data 122, the analyzer 110 may identify one or more ideas 138 and rank the ideas 138 in terms of patentability. In some cases, the ranking may be derived from performing searches on one or more patent databases 160, and one or more publication databases 162. For example, an issue for which a solution has been the subject of numerous patent applications and/or publications may be ranked relatively low if the solution is relatively inexpensive and easily implemented. If the issue has solutions that are relatively expensive or difficult to implement, then an idea that addresses the issue may be ranked relatively high. A disclosure generator 118 may create disclosures for the top X (X>0) ideas (e.g., ideas having an associated score greater than a predetermined amount). Each disclosure may include text and one or more drawings. Each disclosure may be ranked according to novelty, enablement, and clarity. In some cases, the disclosures may be reviewed by a patent review committee that is internal to the enterprise and the comments provided as reinforcement learning to the AI. In some cases, one or more of the disclosures may be filed as a patent application, either as a provisional or as a non-provisional application. In this way, an enterprise can identify and potentially patent ideas that have been implemented within the enterprise to create improvements to internal products and services.

Thus, the systems and techniques described herein extend beyond AI-assisted drafting by including a reinforcement-calibrated framework for identifying potential inventions from operational system behavior in an enterprise. The systems and techniques analyze machine-generated artifacts, including runtime logs, telemetry, execution traces, and other system-level signals, to identify technical activity indicative of potentially inventive concepts, evaluate the potential using quantitative evaluation metrics, and adjust detection and scoring parameters based on patent review committee comments and/or prosecution history (when a corresponding patent application is filed). The generation of a draft patent disclosure and/or patent application may be performed as a downstream function of this iterative discovery and calibration process.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

gathering, by one or more processors, data in a private network that is associated with an enterprise, the data comprising machine-generated digital records comprising at least one of runtime logs, system telemetry, or execution traces automatically produced during software development and runtime operations within the enterprise;

determining, by the one or more processors, a content type of individual data items in the data;

selecting, by the one or more processors, a content-specific encoder from a plurality of encoders based on the content type;

applying, by the one or more processors, the content-specific encoder to transform the data item into a corresponding vector embedding;

determining, by an artificial intelligence executed by the one or more processors and based on one or more policies, a probability that individual vector embeddings in the set of vector embeddings include a patentable idea;

adding the patentable idea to a set of patentable ideas based on determining, by the one or more processors, that the probability is greater than a predetermined patentability threshold;

performing, by a reasoning and acting agent executed by the one or more processors, a search of external databases for individual patentable ideas in the set of patentable ideas to create search results, wherein the reasoning and acting agent executes iterative thought-action-observation cycles in which individual cycles comprise:

generating a search query based on a current reasoning state, submitting the search query to the external databases, evaluating results received from the external databases, and determining whether to refine the query for a subsequent cycle based on evaluating the results;

determining, by the one or more processors, a score for individual patentable ideas in the set of patentable ideas based on the search results, the score comprising a weighted combination of a novelty score, an enablement score, and a clarity score representing respective section-level quality metrics of a candidate patent disclosure;

creating, by a large language model executed by the one or more processors, a patent disclosure document for individual patentable ideas based at least in part on determining that the score greater than a predetermined patent disclosure threshold;

providing the patent disclosure document, by the one or more processors, to a patent review committee;

receiving comments, by the one or more processors, from individual members of the patent review committee, the comments including ratings of the patent disclosure document with respect to novelty, enablement, and clarity;

updating the score to create an updated score by applying an iterative reinforcement learning update rule that incorporates a reward signal derived from the comments, wherein the reward signal comprises a weighted combination of at least a precision metric, a recall metric, and a false positive rate with respect to patentable idea detection; and adjusting, by a reinforcement learning controller and based on the updated score, at least one operating parameter of the artificial intelligence comprising the predetermined patentability threshold, to improve detection of patentable ideas across subsequent data-gathering cycles.

2. The method of claim 1, wherein the iterative reinforcement learning update rule comprises:

$Q\_i(t+1)=Q\_i(t)+\eta(r\_t-Q\_i(t))$, wherein:

$Q_i(t)$ is the composite quality score at iteration t, $\eta$ is a learning rate, and r_t is the reward signal, and wherein the iterative reinforcement learning update continues until a variance of the composite quality score across one or more iterations satisfies $Var(Q_i)<0.05$ or a number of iterations reaches a predetermined convergence limit.

3. The method of claim 1, further comprising:

automatically filing the disclosure as a provisional patent application with a patent office of a particular country;

retrieving, from the patent office of the particular country, a prosecution history of a non-provisional patent application claiming priority from the provisional patent application after the non-provisional patent application has issued as a patent; and incorporating the prosecution history into the reward signal to further update the composite quality score and the at least one operating parameter of the artificial intelligence.

4. The method of claim 1, wherein the data further comprises:

software code commits to a code repository;

documents in a document repository including design documents and marketing documents;

digital records including logs, metrics, and key performance indicators (KPIs); or any combination thereof.

5. The method of claim 1, wherein the reward signal comprises:

a critique score generated by the reasoning and acting agent based on at least one of:

a logical completeness of the patent disclosure document determined based at least in part on chain-of-thought reasoning, self-consistency of the patent disclosure document across multiple reasoning rollouts, or alignment of the patent disclosure document with ratings provided by the patent review committee.

6. The method of claim 1, wherein the external databases comprise:

one or more patent databases;

one or more academic databases that include scholarly papers; or any combination thereof.

7. The method of claim 1, wherein dynamically adjusting at least one operating parameter of the artificial intelligence comprises adjusting at least one of:

a detection policy applied by the artificial intelligence to evaluate vector embeddings, a minimum score weight assigned to the novelty score in the composite quality score, or a minimum score weight assigned to the enablement score in the composite quality score.

8. A computing device comprising:

one or more processors; and one or more non-transitory computer readable media storing instructions executable by the one or more processors to perform operations comprising:

gathering, from a private network, data in a private network that is associated with an enterprise, the data comprising machine-generated digital records comprising at least one of runtime logs, system telemetry, or execution traces automatically produced during software development and runtime operations within the enterprise;

determining a content type of individual data items in the data;

selecting a content-specific encoder from a plurality of encoders based on the content type;

applying the content-specific encoder to transform the data item into a corresponding vector embedding;

determining, by an artificial intelligence and based on one or more policies, a probability that individual vector embeddings in the set of vector embeddings include a patentable idea;

adding the patentable idea to a set of patentable ideas based on determining that the probability is greater than a predetermined patentability threshold;

performing by a reasoning and acting agent, a search of external databases for individual patentable ideas in the set of patentable ideas to create search results, wherein the reasoning and acting agent executes iterative thought-action-observation cycles in which individual cycles comprise:

generating a search query based on a current reasoning state, submitting the search query to the external databases, evaluating results received from the external databases, and determining whether to refine the query for a subsequent cycle based on evaluating the results;

determining a score for individual patentable ideas in the set of patentable ideas based on the search results, the score comprising a weighted combination of a novelty score, an enablement score, and a clarity score representing respective section-level quality metrics of a candidate patent disclosure;

creating, by a large language model, a patent disclosure document for individual patentable ideas based at least in part on determining that the score is greater than a predetermined patent disclosure threshold;

providing the patent disclosure document to a patent review committee;

receiving comments from individual members of the patent review committee;

updating the score to create an updated score by applying an iterative reinforcement learning update rule that incorporates a reward signal derived from the comments, wherein the reward signal comprises a weighted combination of at least a precision metric, a recall metric, and a false positive rate with respect to patentable idea detection; and adjusting, by a reinforcement learning controller and based on the updated score, at least one operating parameter of the artificial intelligence comprising the predetermined patentability threshold, to improve detection of patentable ideas across subsequent data-gathering cycles.

9. The computing device of claim 8, wherein the iterative reinforcement learning update rule comprises:

Q_i(t+1)=Q_i(t)+1(r_t−Q_i(t)), wherein:

Q_i(t) is the composite quality score at iteration t,

η is a learning rate, and r_t is the reward signal, and wherein the iterative reinforcement learning update continues until a variance of the composite quality score across one or more iterations satisfies Var(Q_i)<0.05 or a number of iterations reaches a predetermined convergence limit.

10. The computing device of claim 8, further comprising:

automatically filing the disclosure as a provisional patent application with a patent office of a particular country;

retrieving, from the patent office of the particular country, a prosecution history of a non-provisional patent application claiming priority from the provisional patent application after the non-provisional patent application has issued as a patent; and incorporating the prosecution history into the reward signal to further update the composite quality score and the at least one operating parameter of the artificial intelligence.

11. The computing device of claim 8, wherein the data further comprises:

structured data;

unstructured data; or any combination thereof.

12. The computing device of claim 8, wherein the reward signal comprises:

a critique score generated by the reasoning and acting agent based on at least one of:

a logical completeness of the patent disclosure document determined based at least in part on chain-of-thought reasoning, self-consistency of the patent disclosure document across multiple reasoning rollouts, or alignment of the patent disclosure document with ratings provided by the patent review committee.

13. The computing device of claim 8, wherein dynamically adjusting at least one operating parameter of the artificial intelligence comprises adjusting at least one of:

a detection policy applied by the artificial intelligence to evaluate vector embeddings, a minimum score weight assigned to the novelty score in the composite quality score, or a minimum score weight assigned to the enablement score in the composite quality score.

14. The computing device of claim 8, wherein the data further comprises:

software code commits to a code repository;

documents in a document repository including design documents and marketing documents;

digital records including logs, metrics, and key performance indicators (KPIs); or any combination thereof.

15. One or more non-transitory computer readable media storing instructions executable by one or more processors to perform operations comprising:

gathering, from a private network, data in a private network that is associated with an enterprise, the data comprising machine-generated digital records comprising at least one of runtime logs, system telemetry, or execution traces automatically produced during software development and runtime operations within the enterprise;

determining a content type of individual data items in the data;

selecting a content-specific encoder from a plurality of encoders based on the content type;

applying the content-specific encoder to transform the data item into a corresponding vector embedding;

determining, by an artificial intelligence and based on one or more policies, a probability that individual vector embeddings in the set of vector embeddings include a patentable idea; adding the patentable idea to a set of patentable ideas based on determining that the probability is greater than a predetermined patentability threshold;

performing by a reasoning and acting agent, a search of external databases for individual patentable ideas in the set of patentable ideas to create search results, wherein the reasoning and acting agent executes iterative thought-action-observation cycles in which individual cycles comprise:

generating a search query based on a current reasoning state, submitting the search query to the external databases, evaluating results received from the external databases, and determining whether to refine the query for a subsequent cycle based on evaluating the results;

determining a score for individual patentable ideas in the set of patentable ideas based on the search results, the score comprising a weighted combination of a novelty score, an enablement score, and a clarity score representing respective section-level quality metrics of a candidate patent disclosure;

creating, by a large language model, a patent disclosure document for individual patentable ideas based at least in part on determining that the score is greater than a predetermined patent disclosure threshold;

providing the patent disclosure document to a patent review committee;

receiving comments from individual members of the patent review committee;

updating the score to create an updated score by applying an iterative reinforcement learning update rule that incorporates a reward signal derived from the comments, wherein the reward signal comprises a weighted combination of at least a precision metric, a recall metric, and a false positive rate with respect to patentable idea detection; and adjusting, by a reinforcement learning controller and based on the updated score, at least one operating parameter of the artificial intelligence comprising the predetermined patentability threshold, to improve detection of patentable ideas across subsequent data-gathering cycles.

16. The one or more non-transitory computer readable media of claim 15, wherein the iterative reinforcement learning update rule comprises:

$Q_i(t+1)=Q_i\ t)+\eta(r_t-Q_i(t))$, wherein:

$Q_i(t)$ is the composite quality score at iteration t, f is a learning rate, and $r_t$ is the reward signal, and wherein the iterative reinforcement learning update continues until a variance of the composite quality score across one or more iterations satisfies $Var(Q_i)<0.05$ or a number of iterations reaches a predetermined convergence limit.

17. The one or more non-transitory computer readable media of claim 16, further comprising:

automatically filing the disclosure as a provisional patent application with a patent office of a particular country;

retrieving, from the patent office of the particular country, a prosecution history of a non-provisional patent application claiming priority from the provisional patent application after the non-provisional patent application has issued as a patent; and incorporating the prosecution history into the reward signal to further update the composite quality score and the at least one operating parameter of the artificial intelligence.

18. The one or more non-transitory computer readable media of claim 15, wherein the data further comprises:

software code commits to a code repository;

documents in a document repository including design documents and marketing documents;

digital records including logs, metrics, and key performance indicators (KPIs); or any combination thereof.

19. The one or more non-transitory computer readable media of claim 15, wherein the reward signal comprises:

a critique score generated by the reasoning and acting agent based on at least one of:

a logical completeness of the patent disclosure document determined based at least in part on chain-of-thought reasoning, self-consistency of the patent disclosure document across multiple reasoning rollouts, or alignment of the patent disclosure document with ratings provided by the patent review committee.

20. The one or more non-transitory computer readable media of claim 15, wherein dynamically adjusting at least one operating parameter of the artificial intelligence comprises adjusting at least one of:

a detection policy applied by the artificial intelligence to evaluate vector embeddings, a minimum score weight assigned to the novelty score in the composite quality score, or a minimum score weight assigned to the enablement score in the composite quality score.

* * * * *